United States Patent
Nolan et al.

(10) Patent No.: US 6,728,734 B2
(45) Date of Patent: Apr. 27, 2004

(54) METHOD AND APPARATUS TO FACILITATE DATA UPDATES BETWEEN A BASE PROCESSING UNIT AND A PORTABLE PROCESSING UNIT

(75) Inventors: John T. Nolan, Cape Coral, FL (US); Brian C. Heil, Cape Coral, FL (US); Anthony Capobianco, Cape Coral, FL (US)

(73) Assignee: Sony Corporation (JP)

( * ) Notice: Subject to any disclaimer, the term of this patent is extended or adjusted under 35 U.S.C. 154(b) by 367 days.

(21) Appl. No.: 09/878,561

(22) Filed: Jun. 11, 2001

(65) Prior Publication Data

US 2002/0188623 A1 Dec. 12, 2002

(51) Int. Cl.7 .............................................. G06F 17/30
(52) U.S. Cl. ..................... 707/201; 707/10; 707/101; 707/203; 709/200; 709/318
(58) Field of Search .................. 707/203, 10, 101, 707/201; 709/201, 218, 126, 227, 200, 318; 340/7.29

(56) References Cited

U.S. PATENT DOCUMENTS

| | | | |
|---|---|---|---|
| 5,588,148 A | | 12/1996 | Landis et al. |
| 5,710,922 A | * | 1/1998 | Alley et al. ................ 707/201 |
| 5,831,664 A | | 11/1998 | Wharton et al. |
| 6,034,621 A | | 3/2000 | Kaufman |
| 6,138,158 A | | 10/2000 | Boyle et al. |
| 6,163,274 A | * | 12/2000 | Lindgren ................... 340/7.29 |
| 6,205,478 B1 | * | 3/2001 | Sugano et al. .............. 709/223 |
| 6,356,956 B1 | * | 3/2002 | Deo et al. ................... 709/318 |
| 6,470,358 B1 | * | 10/2002 | Beyda et al. ............... 707/201 |
| 6,584,490 B1 | * | 6/2003 | Schuster et al. ............ 709/200 |
| 6,594,654 B1 | * | 7/2003 | Salam et al. .................. 707/3 |

OTHER PUBLICATIONS

"Personal Computer Memory Card International Association Card," http://whatis.techtarget.com, Aug. 9, 2000.
"HotSync," http://whatis.techtarget.com, pp. 1–2, Aug. 28, 2000.
"CompactFlash Association, CF and CompactFlash Frequently Asked Questions," www.compactflash.org/faqs/faq.htm. pp. 1–7, Aug. 21, 2000.

* cited by examiner

Primary Examiner—Jean M. Corrielus
(74) Attorney, Agent, or Firm—Lerner, David, Littenberg, Krumholz & Mentlik, LLP

(57) ABSTRACT

A method of facilitating data updates between a base processing unit and one or more portable processing units includes receiving an update request signal at the portable processing unit from the base processing unit over a wireless communication channel, the update request signal indicating that a data update between the base processing unit and the portable processing unit is advisable; and issuing an alarm at the portable processing unit that is perceivable by a user of the portable processing unit in response to the update request signal indicating that a data update routine between the base processing unit and the portable processing unit should be initiated by the user.

22 Claims, 5 Drawing Sheets

METHOD AND APPARATUS TO FACILITATE DATA UPDATES BETWEEN A BASE PROCESSING UNIT AND A PORTABLE PROCESSING UNIT

BACKGROUND OF THE INVENTION

The present invention relates to methods and apparatuses for facilitating data updates between a base processing unit and one or more portable processing units and, more particularly, to methods and apparatuses that alert a user or users that data updates are warranted.

Personal digital assistant (PDA) devices are becoming more and more popular for use as organizational tools to users. For example, PDAs may be used as personal calendars, address books, phone books, electronic mail devices, personal information organizers (e.g., medical history repository, etc.), financial planners, etc. The PDAs achieve these functions by executing one or more application software programs, such as a software program providing the calendar function (a "calendar program") The application software programs use one or more databases (or data storage files) in carrying out their functions. For example, the calendar program may utilize one or more database files ("calendar database") that contain the appointments of the user. Similarly, other database files may include data concerning addresses, phone numbers, medical information, etc., which data are used by respective application software programs in carrying out their functions.

While PDAs are often used remotely by users to provide desirable functions, they may also be used in conjunction with a personal computer, such as a desk top computer. A given personal computer may include some or all of the application software programs that reside on a corresponding PDA and, therefore, may contain associated databases to support those programs. The user (or the user's assistant) may execute one or more of the application software programs on the personal computer, such as the calendar program. When the user's calendar is changed on the personal computer, e.g., an appointment is added, deleted, or modified in some way, the calendar database will change. Thus, certain synchronization routines should be executed between the personal computer and the PDA to ensure that the PDA will receive requisite data updates to achieve compliance between, for example, the respective calendar databases of the personal computer and the PDA. If compliance (or incremental synchronization) is not achieved, the information provided by the respective calendar programs of the personal computer and the PDA will be different and therefore of limited value to the user.

In order to achieve compliance between one or more of the databases of the personal computer and the PDA, the user may periodically execute a data update routine (i.e., a synchronization routine). This usually involves a hardwire or cable interconnection between the personal computer and the PDA (e.g., by way of the universal serial bus (USB)) and initiation of the data update routine by the user through the PDA. For example, some PDA devices (such as a Palm™ device) include a HotSynch™ executable icon or button that initiates the data update routine. Respective data update application software programs reside on the personal computer and the PDA that facilitate data transfer between the devices.

The efficacy of the data updates between the personal computer and the PDA hinges on the diligence of the user in initiating the data update routine. For example, when the user knows that calendar information has been modified on the personal computer or the PDA, he or she must remember to execute the data update routine to insure that the personal computer contains the same calendar information as the PDA. In some instances, however, the user may not know that a data update is warranted. For example, the user's assistant may cause one or more of the database files of the personal computer to change when executing one or more of the application software programs on the personal computer. This might happen when electronic mail is received at the personal computer or the PDA, which electronic mail includes important substantive information, contact information, etc. If the assistant does not inform the user that the data have changed, then compliance between the respective database files of the personal computer and the PDA may not be achieved in a timely fashion. Consequently, the utility of the PDA may be compromised.

Accordingly, it would be desirable to provide a new data update routine to insure better compliance between the database files of a personal computer and one or more PDAs without relying solely on the diligence of the user or users in remembering when a data update routine is advisable.

SUMMARY OF THE INVENTION

A method of facilitating data updates between a base processing unit and one or more portable processing units includes: receiving an update request signal at the portable processing unit from the base processing unit over a wireless communication channel, the update request signal indicating that a data update between the base processing unit and the portable processing unit is advisable; and issuing an alarm at the portable processing unit that is perceivable by a user of the portable processing unit in response to the update request signal indicating that a data update routine between the base processing unit and the portable processing unit should be initiated by the user.

Preferably, the portable processing unit includes a stylus, the update request signal is received by the stylus, and the alarm emanates from the stylus. The alarm may be one or both of an audible and visual alarm.

The one or more portable processing units may include a universe of portable processing units and the update request signal may include a code from among a plurality of codes unique to one of the portable processing units of the universe such that only the portable processing unit corresponding to the code issues the alarm. Alternatively, the update request signal may include a code from among a plurality of codes unique to a subset of the portable processing units of the universe such that only the subset of portable processing units corresponding to the code issue respective alarms that are perceivable by respective users of the portable processing units of the subset in response to the update request signal indicating that a data update routine between the base processing unit and the respective portable processing units should be initiated by the respective users.

Preferably, the method further includes manually initiating the data update routine between the base processing unit and the portable processing unit in response to the alarm.

The one or more portable processing units may be taken from the group consisting of personal digital assistant (PDA) units, cell phones, hand held computers, lap top computers, personal computers, set-top boxes, and telephones.

In accordance with a further aspect of the present invention, a portable processing unit capable of engaging in data updates with a base processing unit, includes a receiver operable to receive an update request signal from the base processing unit over a wireless communication channel, the update request signal indicating that a data update between the base processing unit and the portable processing unit is advisable; and an alarm circuit operable to produce an alarm, that is perceivable by a user of the portable processing unit, in response to the update request signal indicating that a data update routine between the base processing unit and the portable processing unit should be initiated by the user.

The portable processing unit preferably includes a stylus that contains the receiver and alarm circuit such that the alarm emanates therefrom. The alarm circuit may produce at least one of an audible and visual alarm.

The one or more portable processing units may include a universe of portable processing units and the update request signal may include a code from among a plurality of codes unique to one of the portable processing units of the universe. In this case, the receiver is preferably operable to determine whether the code of the update request signal corresponds with the portable processing unit such that the alarm circuit issues the alarm only when the correspondence exists. Alternately, the update request signal may include a code from among a plurality of codes unique to a subset of the portable processing units of the universe.

In accordance with one or more further aspects of the present invention, a method of facilitating data updates between a base processing unit and one or more portable processing units includes determining whether a data update between the base processing unit and the one or more portable processing units is advisable; and causing the base processing unit to transmit an update request signal to the portable processing unit over a wireless communication channel, the update request signal indicating that the data update between the base processing unit and the portable processing unit is advisable and should be initiated by a user of the portable processing unit.

The one or more portable processing units may include a universe of portable processing units, and the method may also include selecting a code from among a plurality of codes unique to one of the portable processing units of the universe; and inserting the code into the update request signal such that only the portable processing unit corresponding to the code responds thereto. Alternatively, the selection may be made from among a plurality of codes unique to a subset of the portable processing units of the universe; and the code may be inserted into the update request signal such that only the subset of the portable processing units corresponding to the code respond thereto.

The step of determining whether a data update is advisable may include monitoring whether content of at least one database of the base processing unit does not correspond with at least one related database of the portable processing unit.

In accordance with one or more further aspects of the present invention, a base processing unit capable of engaging in data updates with one or more portable processing units includes a processing circuit operable to determine whether a data update between the base processing unit and the one or more portable processing units is advisable; and a transmitter operable to transmit an update request signal to the portable processing unit over a wireless communication channel, the update request signal indicating that the data update between the base processing unit and the portable processing unit is advisable and should be initiated by a user of the portable processing unit.

The one or more portable processing units may include a universe of portable processing units; and the processing circuit may be operable to select a code from among a plurality of codes unique to one of the portable processing units of the universe and to insert the code into the update request signal such that only the portable processing unit corresponding to the code responds thereto. Alternatively, the processing circuit may be operable to select a code from among a plurality of codes unique to a subset of the portable processing units of the universe and to insert the code into the update request signal such that only the subset of portable processing unit corresponding to the code responds thereto.

Other aspects, features, advantages, etc. will be apparent to one skilled in the art from the description herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited by the precise arrangements and instrumentalities shown.

DETAILED DESCRIPTION

Figure 1:
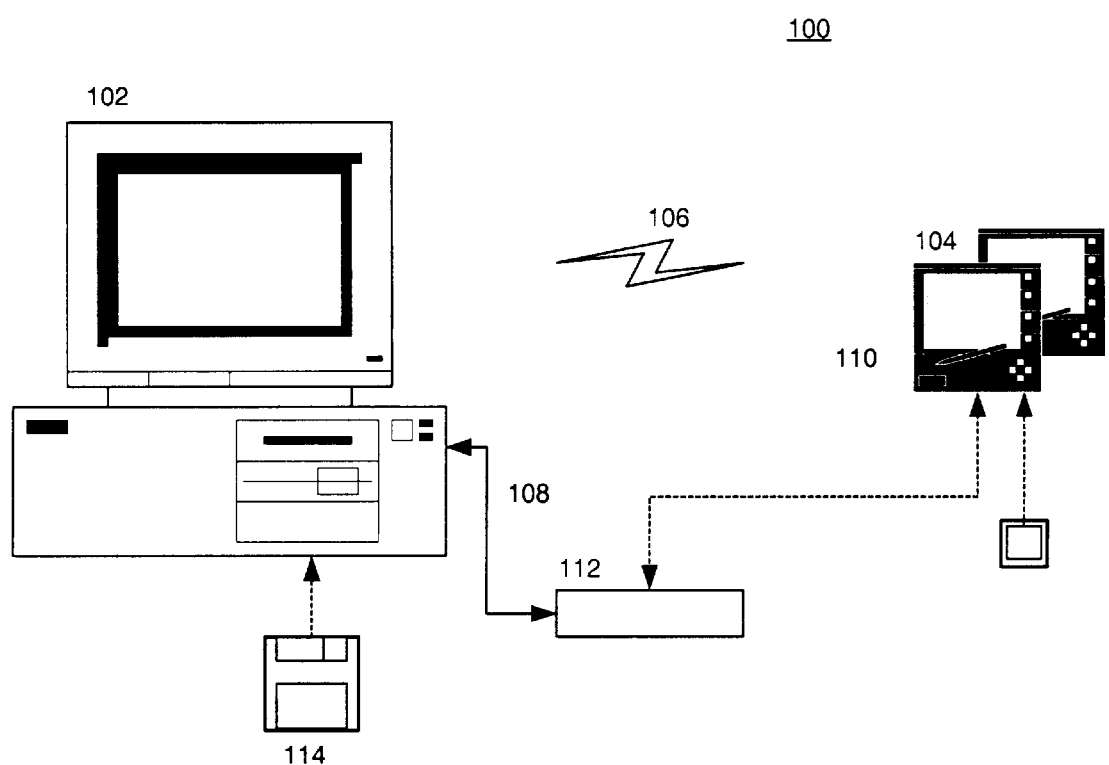
FIG. 1 is a block diagram illustrating apparatuses suitable for use in accordance with the present invention.

Referring now to the drawings wherein like numerals indicate like elements, there is shown in FIG. 1 a block diagram of a system 100 in accordance with one or more aspects of the present invention. The system 100 includes a base processing unit 102, a portable processing unit 104, a wireless communication channel 106 between the base processing unit 102 and the portable processing unit 104, and a cable link 108 between the processing units 102, 104. It is noted that the system 100 may include a single portable processing unit 104 or a plurality of portable processing units 104 depending on the exigencies of the situation. The base processing unit 102 may be a personal computer, laptop computer, set-top box, etc. and the one or more portable processing units 104 may be mobile devices, such as PDAs (e.g., a palm device/computer such as the Palm Pilot™, Windows CE™, etc.); lap top computers, cell phones (e.g., Internet enabled cell phones); hand held computers, etc.

The system 100 preferably includes a cradle 112 coupled to the base processing unit 102 by way of the cable link 108. The one or more portable processing units 104 may be inserted into the cradle 112 to facilitate data transfers between the base processing unit 102 and the portable processing units 104, such as during data update routines.

Figure 2:
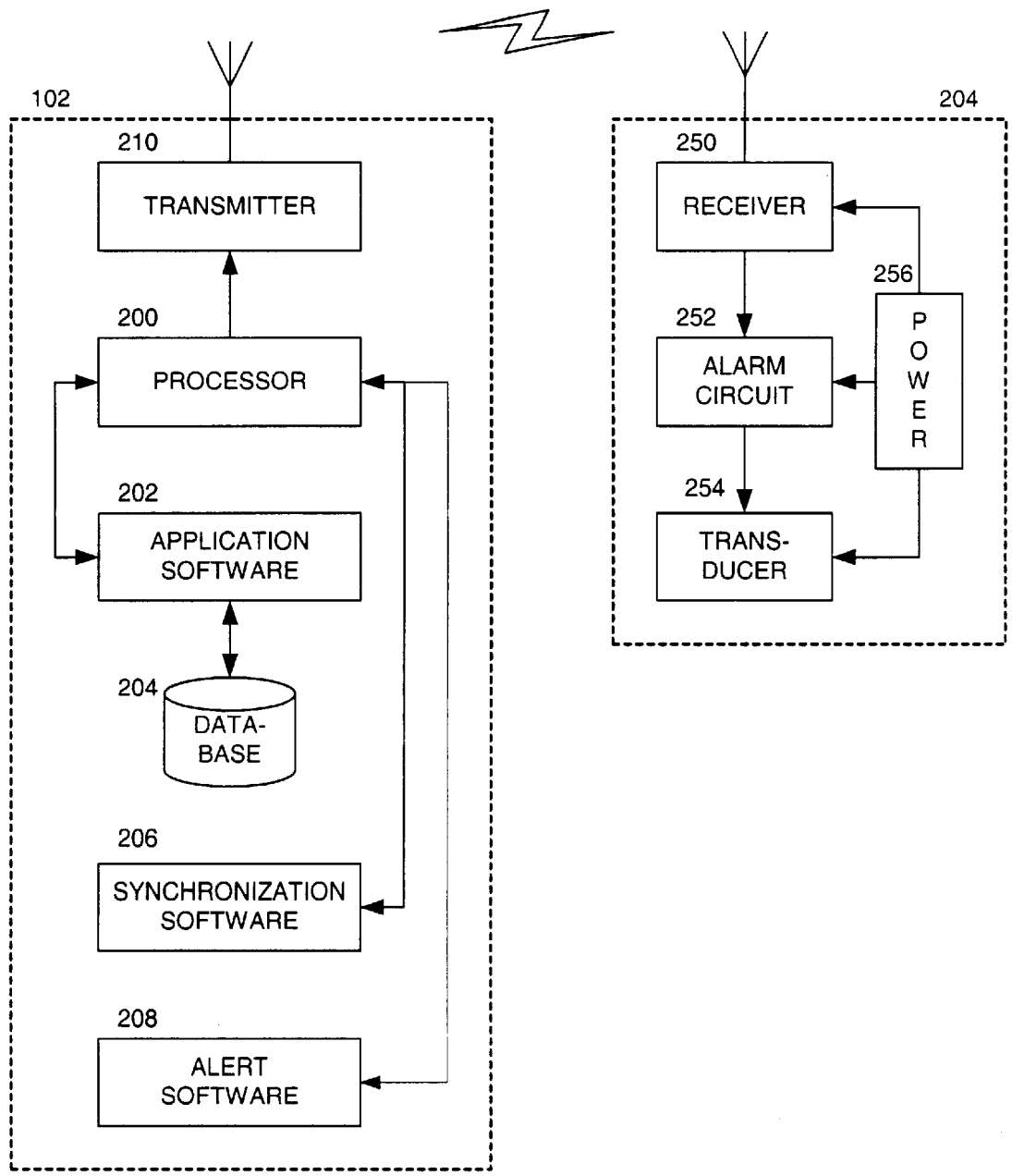
FIG. 2 is a block diagram showing certain circuits and/or functions of the apparatuses of FIG. 1.

With reference to FIG. 2, the base processing unit 102 preferably includes a processor 200, one or more application software programs 202, a synchronization software program 206, an alert software program 208, and a transmitter 210. The processor 200 is preferably capable of executing the one or more application software programs 202 (e.g., a calendar program, an address program, an electronic mail program, etc.). To this end, the application software program(s) 202 may utilize information contained in one or more database files 204 to achieve their respective functions. The processor 200 is also preferably operable to execute the synchronization software program 206 to facilitate data update routines with the one or more portable processing units 104. The processor 200 is also preferably operable to execute the alert software program 208 as will be discussed in more detail later. It is noted that the alert software 208 may be loaded into the base processing unit 102 by way of storage media 114 (FIG. 1). The processor 200 is coupled to the transmitter 210 such that one or more signals may be transmitted over the wireless communication channel 106. The Motorola 12C508A transmitter may be used to implement the transmitter 210, although any of the known transmitters may also be employed without departing from the scope of the invention.

Figure 3:
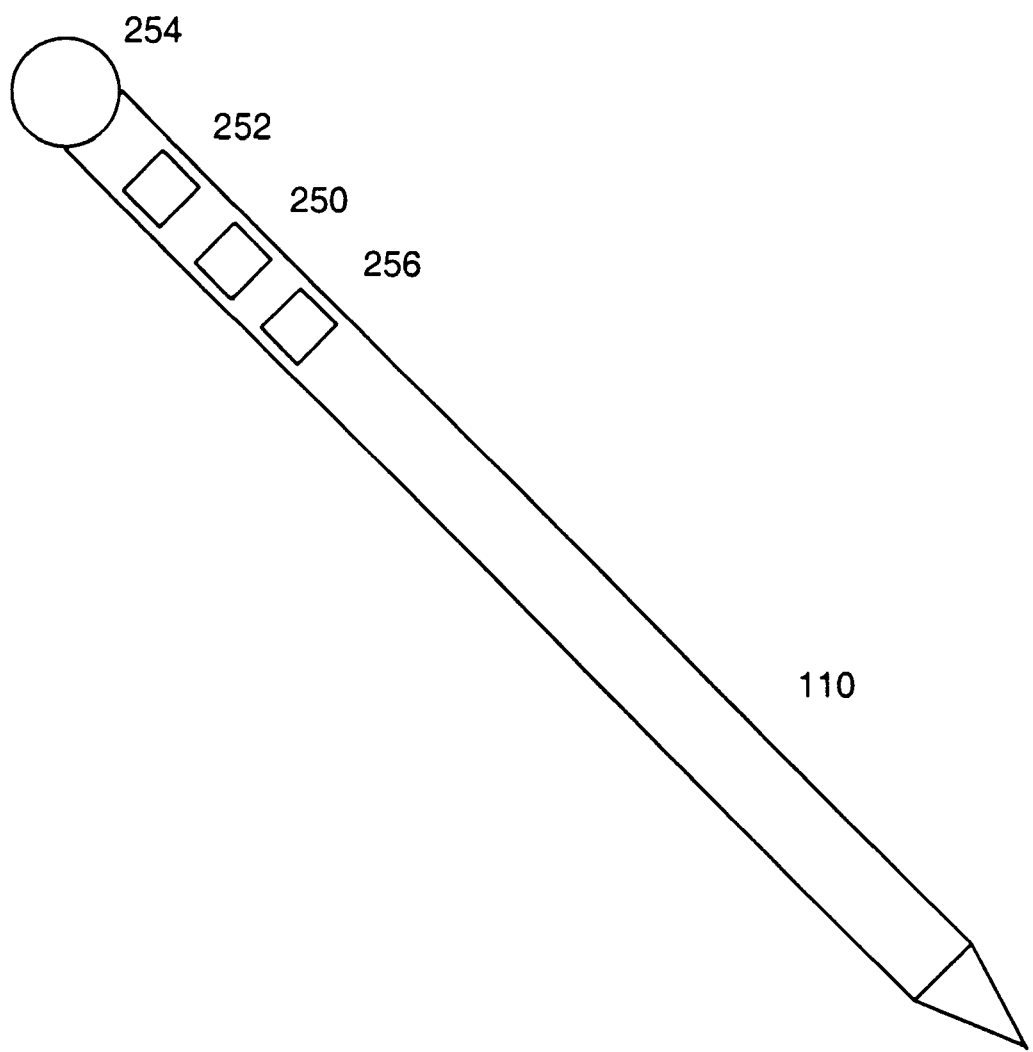
FIG. 3 is a block diagram of a stylus in accordance with one or more aspects of the present invention.

With further reference to FIGS. 1 and 3, the PDA may include a stylus 110 and the portable processing unit 104, alone or in combination with the stylus 110, preferably includes a receiver 250, an alarm circuit 252, a transducer 254, and a power source 256. It is most preferred that these elements are located in the stylus 110 as shown in FIG. 3. The receiver 250 is preferably capable of receiving one or more signals over the wireless communication channel 106, such as the update request signals issued by the base processing unit 102. The alarm circuit 252 is preferably operable to activate in response to the receiver 250 and issue appropriate drive signals to the transducer 254 such that the transducer 254 produces an audible and/or visual alarm perceivable by the user of the portable processing unit 104. The power source 256 is preferably operable to provide operating power to the receiver 250, the alarm circuit 252, and the transducer 254.

Figure 4:
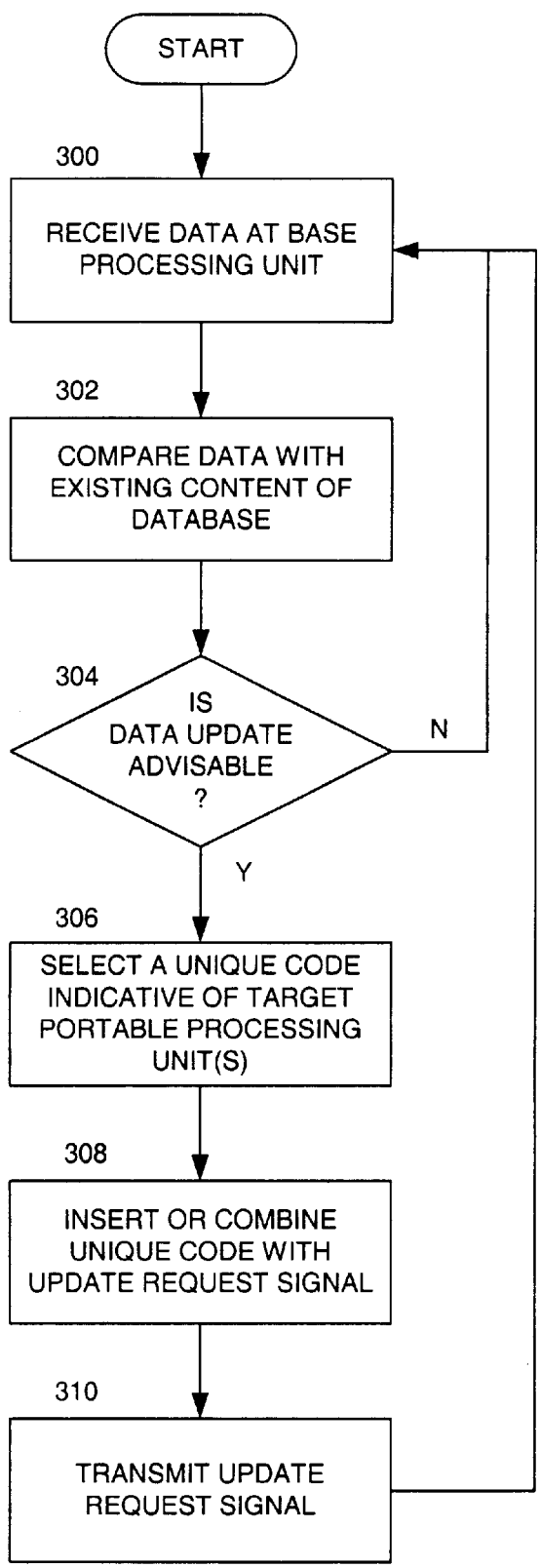
FIG. 4 is a flow diagram illustrating certain actions that may be carried out in accordance with one or more aspects of the present invention.

The base processing unit 102 is preferably capable of carrying out certain actions in accordance with one or more aspects of the present invention. These actions may be triggered through execution of the alert software 208. The alert software 208 preferably imbues the base processing unit 102 with the capability of executing one or more of the actions illustrated in the flow diagram of FIG. 4. For example, after starting, at action 300 the base processing unit 102 may receive data as a result of executing a certain application software program 202, such as the calendar program, etc. At action 302, the alert software 208 in combination with the processor 200 compares this received data with existing content of the database 204 to determine whether a data update is advisable between the base processing unit 102 and the portable processing unit 104 (action 304). If a data update is advisable, the process flow advances to action 306. If, however, a data update is not advisable, the process flow returns to action 300.

When it is advisable to execute the data update routine between the base processing unit 102 and the portable processing unit 104 (i.e., action 304 is affirmative), the base processing unit 102 preferably transmits an update request signal to the portable processing unit 104 over the wireless communication channel 106. The update request signal preferably indicates that the data update between the base processing unit 102 and the portable processing unit 104 is advisable and should be initiated by the user of the portable processing unit 104.

As discussed above, the system 100 (FIG. 1) may include a plurality of portable processing units 104. In this case, the processor 200 in combination with the alert software 208 preferably enables the base processing unit 102 to select a unique code (e.g., encoded bits) indicative of one of the plurality of portable processing units 104 that are to be targeted with the update request signal (action 306, FIG. 4). Alternatively, the unique code may be indicative of a subset of the plurality of portable processing units 104 that are to be targeted with the update request signal (action 306). At action 308, the processor 200 preferably inserts or combines the unique code with the update request signal and transmits the signal over the wireless communication channel 106 (action 310).

Figure 5:
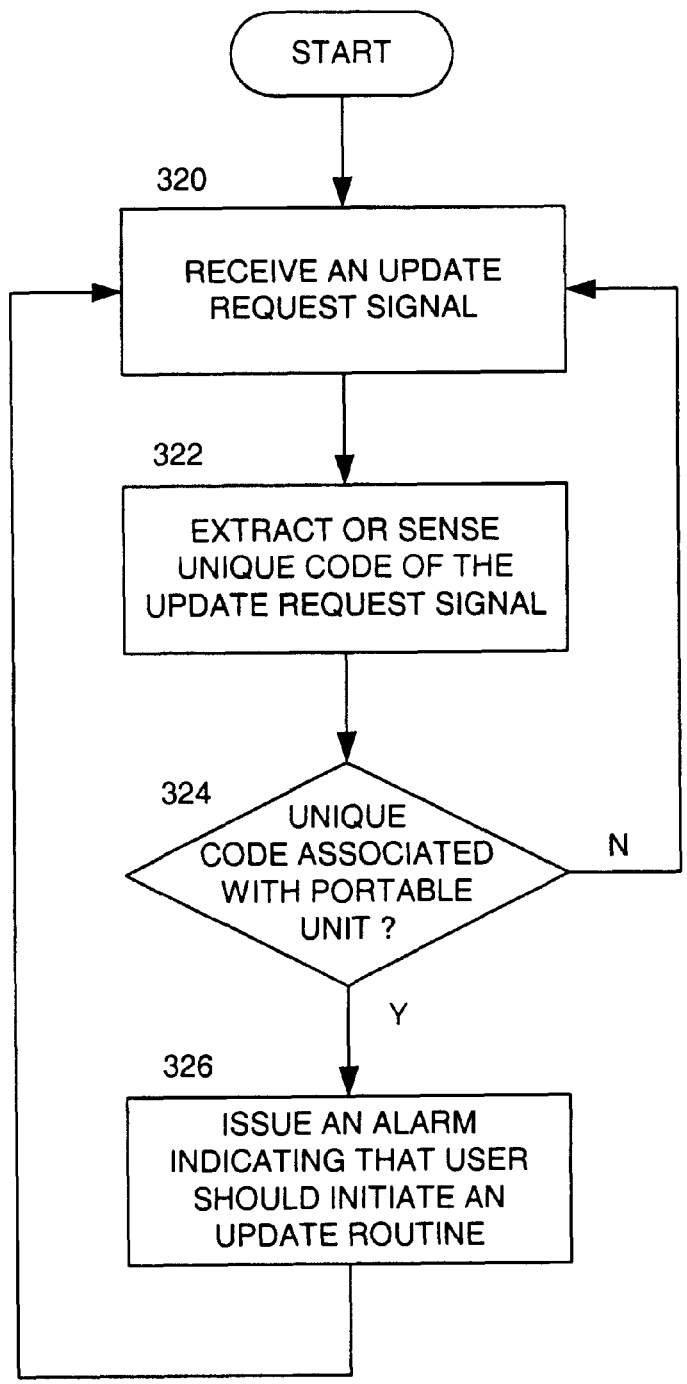
FIG. 5 is a flow diagram illustrating further actions that may be carried out in accordance with one or more further aspects of the present invention.

With reference to FIG. 5, one or more of the portable processing units 104 are preferably capable of carrying out certain actions, such as one or more of those illustrated in FIG. 5. In particular, at action 320, the portable processing unit 104 receives an update request signal from the base processing unit 102 over the wireless communication channel 106. As the update request signal indicates that a data update between the base processing unit 102 and the portable processing unit 104 is advisable, the portable processing unit 104 is preferably operable to issue an alarm that is perceivable by the user in response to the update request signal. Advantageously, this indicates that a data update routine between the base processing unit and the portable processing unit should be initiated by the user (action 326). With further reference to FIG. 2, at action 322 the receiver 250 preferably receives the update request signal and extracts or senses the unique code of the update request signal (see actions 306 and 308 of FIG. 4). If the unique code extracted from the update request signal is associated with the given portable processing unit 104, then the process advances to action 326 where the alarm is issued. If the unique code is not associated with the given portable unit, then the process flow returns to action 320. It is noted that the unique code may be indicative of a subset of the plurality of portable processing units 104 and, therefore, the subset of portable processing units 104 preferably issue respective alarms to respective users that the update routine should be initiated.

Advantageously, the methods and apparatuses of the present invention improve the synchronization between the base processing unit 102 and the one or more portable processing units 104 by prompting the user to initiate data update routines when they are advisable. Thus, for example, even when the user does not know that compliance does not exist between the respective database files of the base processing unit 102 and the portable processing unit 104, the present invention alerts the user that a data update routine should be initiated.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of facilitating data updates between a base processing unit and one or more portable processing units, comprising:

receiving an update request signal at the portable processing unit from the base processing unit over a wireless communication channel, the update request signal indicating that a data update between the base processing unit and the portable processing unit is advisable; and issuing an alarm at the portable processing unit that is perceivable by a user of the portable processing unit in response to the update request signal indicating that a data update routine between the base processing unit and the portable processing unit should be initiated by the user, wherein the one or more portable processing units include a universe of portable processing units and the update request signal includes a code from among a plurality of codes unique to one of the portable processing units of the universe such that only the portable processing unit corresponding to the code issues the alarm.

2. The method of claim 1, wherein the portable processing unit includes a stylus, the update request signal is received by the stylus, and the alarm emanates from the stylus.

3. The method of claim 2, wherein the alarm is at least one of an audible and visual alarm.

4. The method of claim 1, wherein the one or more portable processing units include a universe of portable processing units and the update request signal includes a code from among a plurality of codes unique to a subset of the portable processing units of the universe such that only the subset of portable processing units corresponding to the code issue respective alarms that are perceivable by respective users of the portable processing units of the subset in response to the update request signal indicating that a data update routine between the base processing unit and the respective portable processing units should be initiated by the respective users.

5. The method of claim 1, further comprising manually initiating the data update routine between the base processing unit and the portable processing unit in response to the alarm.

6. The method of claim 1, wherein the one or more portable processing units are taken from the group consisting of personal digital assistant (PDA) units, cell phones, hand held computers, lap top computers, personal computers, set-top boxes, and telephones.

7. A portable processing unit capable of engaging in data updates with a base processing unit, comprising:

a receiver operable to receive an update request signal from the base processing unit over a wireless communication channel, the update request signal indicating that a data update between the base processing unit and the portable processing unit is advisable; and an alarm circuit operable to produce an alarm, that is perceivable by a user of the portable processing unit, in response to the update request signal indicating that a data update routine between the base processing unit and the portable processing unit should be initiated by the user, wherein:

the one or more portable processing units include a universe of portable processing units and the update request signal includes a code from among a plurality of codes unique to one of the portable processing units of the universe; and the receiver is further operable to determine whether the code of the update request signal corresponds with the portable processing unit such that the alarm circuit issues the alarm only when the correspondence exists.

8. The portable processing unit of claim 7, further comprising a stylus that includes the receiver and alarm circuit such that the alarm emanates therefrom.

9. The portable processing unit of claim 8, wherein the alarm circuit is operable to produce at least one of an audible and visual alarm.

10. The portable processing unit of claim 7, wherein:

the one or more portable processing units include a universe of portable processing units and the update request signal includes a code from among a plurality of codes unique to a subset of the portable processing units of the universe;

the receiver is further operable to determine whether the code of the update request signal corresponds with the portable processing unit such that the alarm circuit issues the alarm only when the correspondence exists.

11. The portable processing unit of claim 7, wherein the one or more portable processing units are taken from the group consisting of personal digital assistance (PDA) units, cell phones, hand held computers, lap top computers, personal computers, set-top boxes, and telephones.

12. A method of facilitating data updates between a base processing unit and one or more portable processing units, the one or more portable processing units including a universe of portable processing units, the method comprising:

determining whether a data update between the base processing unit and the one or more portable processing units is advisable;

selecting a code from among a plurality of codes unique to one of the portable processing units of the universe;

inserting the code into the update request signal such that only the portable processing unit corresponding to the code responds thereto; and causing the base processing unit to transmit an update request signal to the portable processing unit over a wireless communication channel, the update request signal indicating that the data update between the base processing unit and the portable processing unit is advisable and should be initiated by a user of the portable processing unit.

13. The method of claim 12, wherein the one or more portable processing units include a universe of portable processing units, the method further comprising:

selecting a code from among a plurality of codes unique to a subset of the portable processing units of the universe; and inserting the code into the update request signal such that only the subset of the portable processing units corresponding to the code respond thereto.

14. The method of claim 12, wherein the step of determining whether a data update is advisable includes monitoring whether content of at least one database of the base processing unit does not correspond with at least one related database of the portable processing unit.

15. The method of claim 12, further comprising conducting a data update routine with the portable processing unit in response to a request by the portable processing unit.

16. A storage medium containing a software program operable to cause a processing unit to execute steps for facilitating data updates between a base processing unit and one or more portable processing units, the one or more portable processing units including a universe of portable processing units, the steps comprising:

determining whether a data update between the base processing unit and the one or more portable processing units is advisable;

selecting a code from among a plurality of codes unique to one of the portable processing units of the universe;

inserting the code into the update request signal such that only the portable processing unit corresponding to the code responds thereto; and causing the base processing unit to transmit an update request signal to the portable processing unit over a wireless communication channel, the update request signal indicating that the data update between the base processing unit and the portable processing unit is advisable and should be initiated by a user of the portable processing unit.

17. The storage medium of claim 16, wherein the one or more portable processing units include a universe of portable processing units, the steps further comprising:

selecting a code from among a plurality of codes unique to a subset of the portable processing units of the universe; and inserting the code into the update request signal such that only the subset of the portable processing units corresponding to the code respond thereto.

18. The storage medium of claim 16, wherein the step of determining whether a data update is advisable includes monitoring whether content of at least one database of the base processing unit does not correspond with at least one related database of the portable processing unit.

19. The storage medium of claim 16, wherein the steps further comprise conducting a data update routine with the portable processing unit in response to a request by the portable processing unit.

20. A base processing unit capable of engaging in data updates with one or more portable processing units, the one or more portable processing units including a universe of portable processing units, the unit comprising:

a processing circuit operable to determine whether a data update between the base processing unit and the one or more portable processing units is advisable; and a transmitter operable to transmit an update request signal to the portable processing unit over a wireless communication channel, the update request signal indicating that the data update between the base processing unit and the portable processing unit is advisable and should be initiated by a user of the portable processing unit, wherein the processing circuit is further operable to select a code from among a plurality of codes unique to one of the portable processing units of the universe and to insert the code into the update request signal such that only the portable processing unit corresponding to the code responds thereto.

21. The base processing unit of claim 20, wherein:

the one or more portable processing units include a universe of portable processing units; and the processing circuit is further operable to select a code from among a plurality of codes unique to a subset of the portable processing units of the universe and to insert the code into the update request signal such that only the subset of portable processing unit corresponding to the code responds thereto.

22. The method of claim 20, wherein the processing circuit is operable to monitor whether content of at least one database of the base processing unit does not correspond with at least one related database of the portable processing unit.

* * * * *